United States Patent [19]
Kahle et al.

[11] Patent Number: 5,898,882
[45] Date of Patent: Apr. 27, 1999

[54] METHOD AND SYSTEM FOR ENHANCED INSTRUCTION DISPATCH IN A SUPERSCALAR PROCESSOR SYSTEM UTILIZING INDEPENDENTLY ACCESSED INTERMEDIATE STORAGE

[75] Inventors: James Allan Kahle; Chin-Cheng Kau, both of Austin; Aubrey Deene Ogden, Round Rock; Ali Asghar Poursepanj; Paul Kang-Guo Tu, both of Austin; Donald Emil Waldecker, Round Rock, all of Tex.

[73] Assignee: International Business Machines Corporation, Armonk, N.Y.

[21] Appl. No.: 08/001,865

[22] Filed: Jan. 8, 1993

[51] Int. Cl.[6] .................................................. G06F 15/16
[52] U.S. Cl. ........................ 395/800.23; 395/800.03; 395/382; 395/391; 395/393; 395/872; 711/5; 711/168; 711/169
[58] Field of Search ................................... 395/800, 375, 395/800.03, 800.23, 393, 391, 382, 872; 711/5, 168–169

[56] References Cited

U.S. PATENT DOCUMENTS 4,051,551  9/1977  Lawrie et al. ......................... 711/168
5,136,697  8/1992  Johnson ................................ 395/586

OTHER PUBLICATIONS

Sohi, "Instruction Issue Logic for High–Performance, Interruptible, Multiple Functional Unit, Pipelined Computers," 1990, 349–359.

*Primary Examiner*—Tod R. Swann
*Assistant Examiner*—Denise Tran
*Attorney, Agent, or Firm*—Casimer K. Salys; Andrew J. Dillon

[57] ABSTRACT

A method and system for permitting single cycle instruction dispatch in a superscalar processor system which dispatches multiple instructions simultaneously to a group of execution units for execution and placement of results thereof within specified general purpose registers. Each instruction generally includes at least one source operand and one destination operand. A plurality of intermediate storage buffers are provided and each time an instruction is dispatched to an available execution unit, a particular one of the intermediate storage buffers is assigned to any destination operand within the dispatched instruction, permitting the instruction to be dispatched within a single cycle by eliminating any requirement for determining and selecting the specified general purpose register or a designated alternate general purpose register.

10 Claims, 6 Drawing Sheets

METHOD AND SYSTEM FOR ENHANCED INSTRUCTION DISPATCH IN A SUPERSCALAR PROCESSOR SYSTEM UTILIZING INDEPENDENTLY ACCESSED INTERMEDIATE STORAGE

CROSS-REFERENCE TO RELATED APPLICATION

The present application is related to U.S. patent application Ser. No. 08/001,864, now U.S. Pat. No. 5,465,393, entitled "Method and System for Single Cycle Dispatch of Multiple Instructions in a Superscalar Processor System," U.S. patent application Ser. No. 08/689,437 now U.S. Pat. No. 5,764,942, entitled "Method and System for Selective Serialization of Instruction Processing in a Superscalar Processor System," U.S. patent application Ser. No. 08,438, 819, now U.S. Pat. No. 5,491,829, entitled "Method and System for Indexing the Assignment of Intermediate Storage Buffers in a Superscalar Processor System," U.S. patent application Ser. No. 08/255,130, entitled "Method and System for Nonsequential Instruction Dispatch and Execution in a Superscalar Processor System," and U.S. patent application Ser. No. 08/479,258, now abandoned, entitled "Method and System for Tracking Scalar Instructions Within a Superscalar Processor System," all filed of even date herewith by the inventors hereof and assigned to the assignee herein, and incorporated by reference herein.

BACKGROUND OF THE INVENTION

1. Technical Field

The present invention relates in general to an improved data processing system and in particular to a method and system for enhanced instruction dispatch efficiency in a superscalar processor system. Still more particularly, the present invention relates to a method and system for enhanced instruction dispatch in a superscalar processor system utilizing independently accessed intermediate storage.

2. Description of the Related Art

Designers of modern state-of-the-art data processing systems are continually attempting to enhance performance aspects of such systems. One technique for enhancing data processing efficiency is the achievement of short cycle times and a low Cycles-Per-Instruction (CPI) ratio. An excellent example of the application of these techniques to an enhanced data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a superscalar implementation, which means that multiple instructions are issued and executed simultaneously.

The simultaneous issuance and execution of multiple instructions requires independent functional units that can execute concurrently with a high instruction bandwidth. The RS/6000 system achieves this by utilizing separate branch, fixed point and floating point processing units which are pipelined in nature. In view of the pipelined nature of the processors in such systems care must be taken to ensure that a result from a particular instruction which is necessary for execution of a subsequent instruction is obtained prior to dispatching the subsequent instruction. One technique for ensuring that such so-called "data dependency hazards" do not occur is the restriction of the dispatching of a particular instruction until such time as all preceding instructions have been dispatched. While this technique ensures that data dependency hazards will not occur, the performance penalty encountered utilizing this technique is substantial.

As a consequence, modern superscalar data processing systems often utilize a so-called "data dependency interlock circuit." Such circuits contain logic which operates in concert with instruction dispatch circuitry to ensure that an instruction is not dispatched until such time as a result from a preceding instruction which is necessary for correct execution of that instruction has been obtained. The amount of logic required to implement a data dependency interlock circuit is directly proportional to the number of source operands within each instruction. A source operand is a field within an instruction which is utilized to access an operand within a register file, for utilization in execution of that instruction.

While data dependency interlock circuits permit data dependency hazards to be avoided without encountering the substantial performance penalty described above, the design and implementation of data dependency interlock circuits for instructions which include larger numbers of source and destination operands becomes quite complex.

The data dependency hazards which occur with the simultaneous executing of multiple instructions in each processor cycle have also been addressed by utilizing an approach known as "register renaming." Register renaming is a technique utilized to temporarily place the results of a particular instruction into a register for potential use by later instructions prior to the time the final result from an instruction is placed within a register file. Register renaming is generally accomplished by providing a register file array with extra locations and a pointer arrangement to identify particular physical registers which have been assigned to logical registers. Selected prior art approaches also utilize multiple register file arrays to provide many "read" ports for data or for holding previous results for backup in the case of exceptions.

While this technique provides the ability to simultaneously dispatch and execute multiple instructions where serial execution might otherwise be necessary, a problem exists with the dispatching of instructions to execution units utilizing such techniques. A destination location for storing results of the execution of an instruction, as well as source locations for operands necessary to perform that execution must be identified in order to permit an instruction to be dispatched. Complex register renaming schemes require utilization of lookup tables and/or logic circuitry and utilization of lookup tables and/or logic circuitry and often result in contention between execution units for access to the register file which includes the renamable registers, diminishing the efficiency of processing in such systems.

It should therefore be apparent that a need exist for a method and system which permit enhanced instruction dispatch within a superscalar processor system by providing independently accessible intermediate storage devices such that contention between execution units for data destinations is minimized.

SUMMARY OF THE INVENTION

It is therefore one object of the present invention to provide an improved data processing system.

It is another object of the present invention to provide an improved method and system for enhanced instruction dispatch efficiency in a superscalar processor system.

It is yet another object of the present invention to provide an improved method and system for enhanced instruction dispatch in a superscalar processor system utilizing independently accessed intermediate storage.

The foregoing objects are achieved as is now described. The method and system of the present invention permits enhanced instruction dispatch in a superscalar processor system which dispatches multiple instructions simultaneously to a group of execution units for execution and placement of results thereof within specified general purpose registers. Each instruction generally includes at least one source operand and one destination operand. A plurality of intermediate storage buffers are provided which are each coupled to all execution units by an independent bus. Each time an instruction is dispatched to an available execution unit, a particular one of the intermediate storage buffers is assigned to any destination operand within the dispatched instruction, permitting the instruction to be dispatched efficiently by eliminating any requirement for determining and selecting the specified general purpose register or a designated alternate general purpose register and by permitting the execution unit to directly access the designated intermediate storage buffer via the independent bus, eliminating possible contention for access with other execution units.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
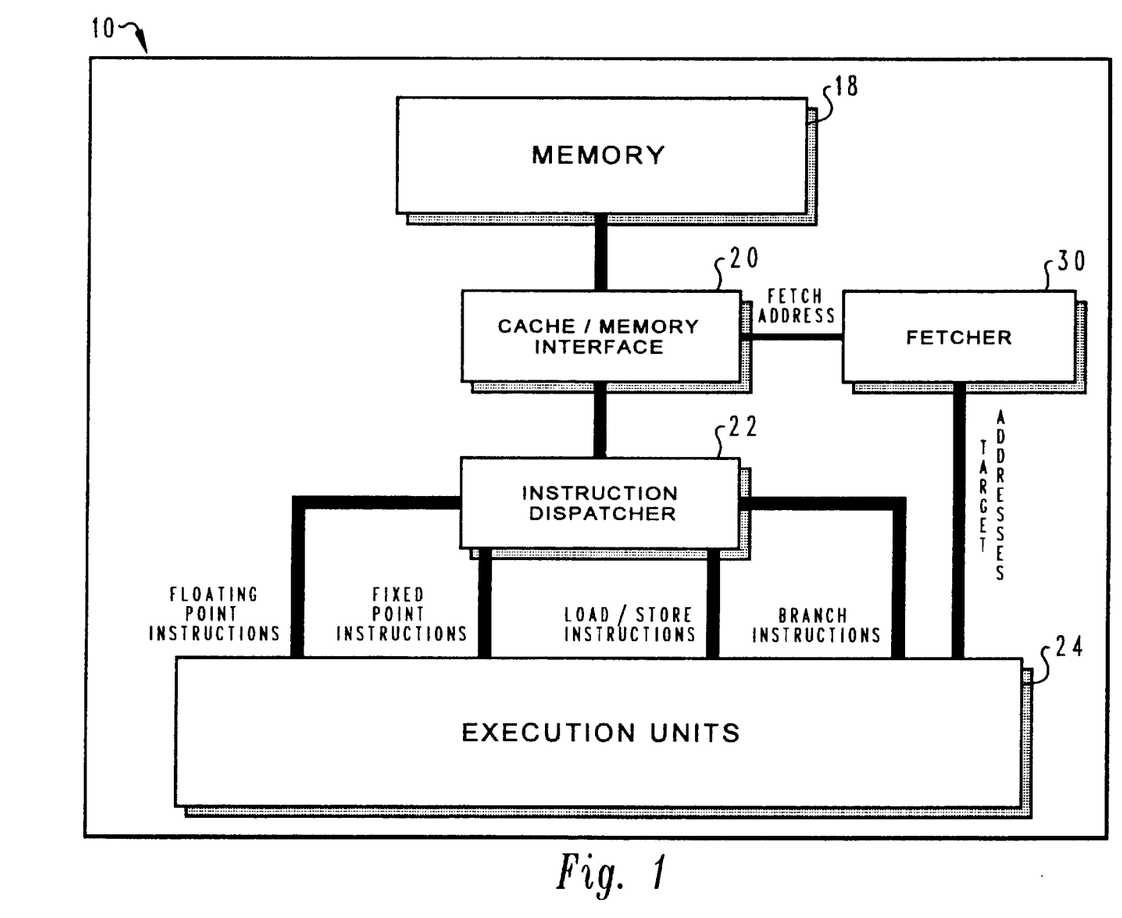
FIG. 1 is a high level block diagram of superscalar data processing system which may be utilized to implement the method and system of the present invention.

With reference now to the figures and in particular with reference to FIG. 1, there is depicted a high level block diagram of a superscalar data processing system 10 which may be utilized to implement the method and system of the present invention. As illustrated, data processing system 10 includes a memory 18 which is utilized to store data, instructions and the like. Data or instructions stored within memory 18 are preferably accessed utilizing cache/memory interface 20 in manner well known to those having skill in the art. The sizing and utilization of cache memory systems is a well known subspeciality within the data processing art and is not addressed within the present application. However, those skilled in the art will appreciate that by utilizing modern associative cache techniques, a large percentage of memory accesses may be achieved utilizing data temporarily stored within cache/memory interface 20.

Instructions from cache/memory interface 20 are typically loaded into instruction dispatch 22 which preferably includes a plurality of queue positions. In a typical embodiment of a superscalar data processing system each position within the instruction dispatch may include between two and eight instructions and thus, in a given cycle, up to eight instructions may be loaded into instruction dispatch 22, depending upon how many valid instructions are passed by cache/memory interface 20 and how much space is available within instruction dispatch 22.

As is typical in such superscalar data processing systems, instruction dispatcher 22 is utilized to dispatch instructions to execution units 24. As depicted within FIG. 1, data processing system 10 may include one or more floating point units, fixed point processor units, load/store units, and a branch processor unit, as a matter of design choice. Thus, instruction dispatcher 22 may dispatch multiple instructions during a single cycle, one each execution unit. Execution units may include reservation stations which could permit dispatch of more than one instruction to a single execution unit during a single cycle, as a matter of design choice. Thus, multiple execution units in a superscalar processor may each receive multiple instructions in a single cycle. Additionally, in multiprocessor systems instructions may be dispatched to multiple execution units 24 associated with multiple processors.

Figure 2:
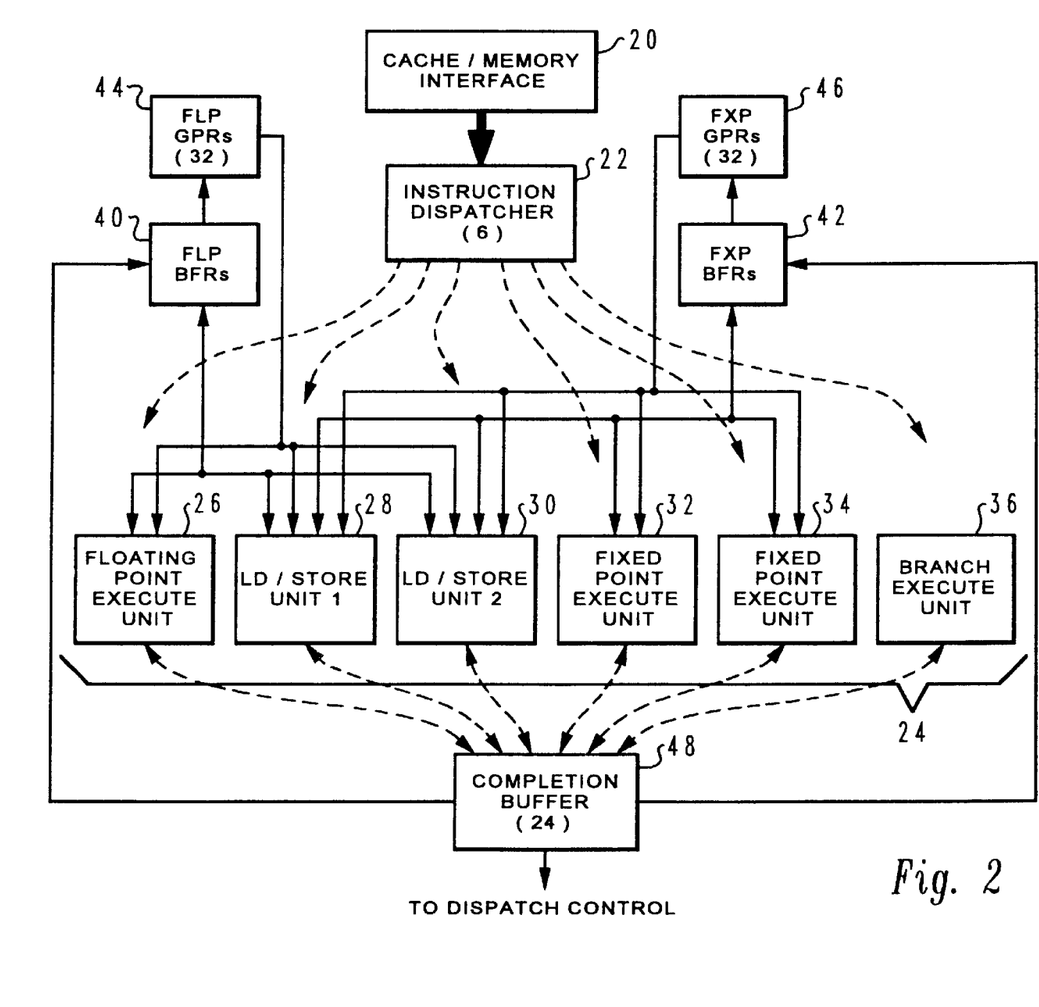
FIG. 2 is a more detailed block diagram of the instruction dispatch circuitry of the superscalar data processing system of FIG. 1 which may be utilized to implement the method and system of the present invention.

Referring now to FIG. 2, there is depicted a more detailed block diagram of the instruction dispatch circuitry of the superscalar data processing system of FIG. 1 which may be utilized to implement the method and system of the present invention. As illustrated, instructions from cache/memory interface 20 are typically loaded into instruction dispatcher 22 in groups in an application specified sequential order. Thus, as a matter of design choice, a group of two, four, or eight instructions are loaded from cache/memory interface 20 into instruction dispatcher 22, for dispatch on an opportunistic basis to one or more execution units within execution units 24. As depicted in the illustrated embodiment within FIG. 2, these execution units may include a floating point execution unit 26, multiple load/store units 28 and 30, multiple fixed point execution units 32 and 34, and a branch execution unit 36. Of course, as discussed above, a greater or lesser number of execution units of different types may be included within data processing system 10 as a matter of design choice.

As is typical in superscalar data processing systems such as the type depicted herein, a plurality of general purpose registers are also provided. In the depicted embodiment within FIG. 2, two groups of general purpose registers are provided. Floating point general purpose registers 44 and fixed point general purpose registers 46. Thus, the results of the execution of multiple instructions within the execution units depicted within FIG. 2 are typically stored within a selected general purpose register for future utilization. In accordance with an important feature of the present invention, a plurality of intermediate storage buffers are also provided. That is, floating point intermediate storage buffers 40 and fixed point intermediate storage buffers 42. As will be explained in greater detail herein, each execution unit is connected to each intermediate storage buffer via an independent bus. Thus, data required by an execution unit, or generated by the execution of an instruction within an execution unit, may be placed on an independent bus and stored within a designated intermediate storage buffer for utilization by other execution units or for future transfer to a general purpose register.

In this manner, the maintaining of complex lookup tables typically associated with register renaming scheme is not required and an intermediate storage buffer may be efficiently assigned to be immediately utilized as a storage location for a destination operand, permitting the instruction to be dispatched within a single processor cycle, since data locations do not need to be determined within a renamed register file. Additionally, the execution of instructions in a non-sequential manner may be permitted, with the output of those instructions being temporarily stored within intermediate storage buffers for future assembly within the general purpose registers in the application specified sequential order.

As depicted, the fixed point execution units are each coupled via an independent bus to fixed point intermediate storage buffers 42, while the floating point execution unit is connected to each floating point intermediate storage buffer 40, via an independent bus. Load/store units 28 and 30, as those skilled in the art will appreciate, are necessarily connected to floating point intermediate storage buffers 40 and fixed point intermediate storage buffers 42, since these units will load and store both fixed point and floating point data.

In accordance with another important feature of the present invention a completion buffer 48 is provided. Completion buffer 48 is utilized to track the completion of the multiple scalar instructions which are being executed within execution units 24. The results of the execution of these instructions, as described above, are each temporarily stored within an associated intermediate storage buffer and, upon an indication that an instruction or a group of instructions have been completed successfully, in an application specified sequential order, completion buffer 48 may be utilized to initiate the transfer of the results of those completed instructions data to the associated general purpose registers. Additionally, in the event an exception condition occurs, completion buffer 48 may be utilized to initiate storage of the results of the execution of any instruction which completed prior to the exception and to control instruction dispatcher 22 to restart the process at the point where the exception condition occurred, permitting corrupted or invalid data to be replaced by a valid output in an efficient manner, or to initiate a new sequence of instructions as specified by the application specific program for specific types of exceptions.

Figure 3:
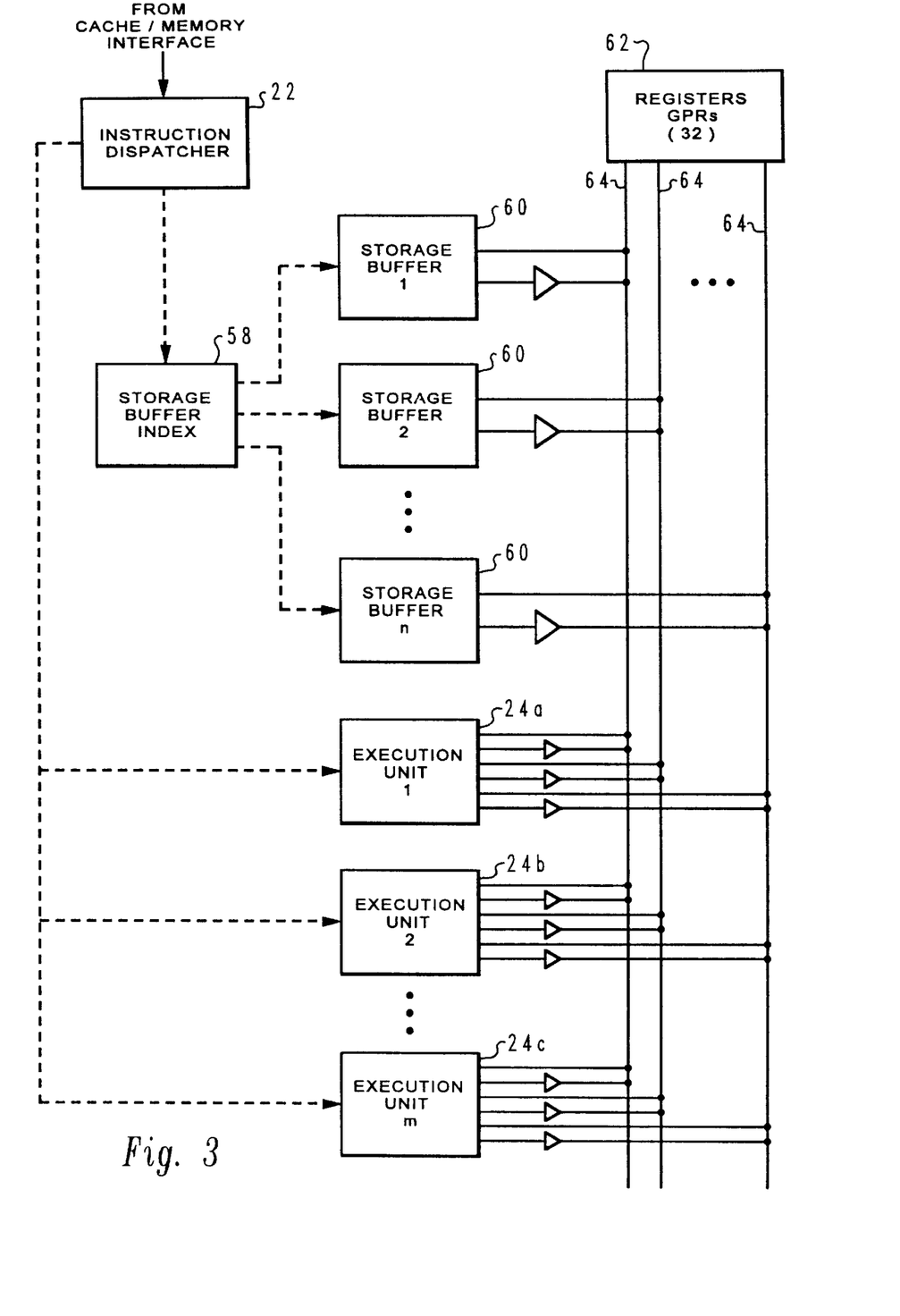
FIG. 3 is a high level block diagram which depicts the utilization of intermediate storage buffers within the superscalar data processing system of FIG. 1 in accordance with the method and system of the present invention.

With reference now to FIG. 3, there is depicted a high level block diagram illustrating the utilization of intermediate storage buffers within the superscalar processor system of FIG. 1, in accordance with the method and system of the present invention. A storage buffer index 58 is provided which is accessible by instruction dispatcher 22. As will be described in greater detail herein, storage buffer index 58 is utilized to store and maintain an indication of the relationship between each of a plurality of intermediate storage buffers 60 and a designated general purpose register 62 for utilization during execution of succeeding instructions.

The plurality of intermediate storage buffers 60 are preferably connected to multiple independent buses 64. In the preferred embodiment, the number of independent buses 64 equals the number of intermediate storage buffers 60, with each intermediate storage buffer connected to one bus. Each of the intermediate storage buffers 60 may read from and write to a corresponding independent bus 64. Those skilled in the art will recognize that the number of buses utilized may vary as a matter of design choice.

A plurality of execution units 24a, 24b, 24c depicted and are coupled to each of the multiple independent buses 64. In the preferred embodiment, execution units 24a, 24b, 24c may include a floating point execution unit, multiple load/store units, multiple fixed point execution units, and a branch execution unit. However, those skilled in the art will appreciate that the number and type of execution units may vary as a matter of design choice.

Each of the plurality of execution units 24a, 24b, 24c may also read from and write to each of the independent buses 64. Consequently, each of the plurality of execution units 24a, 24b, 24c are coupled to each of the plurality of intermediate storage buffers 60, via the multiple independent buses 64. Thus, when data is generated by the execution of an instruction within an execution unit, the execution unit may place that data on a bus corresponding to a designated intermediate storage buffer which has been specified as a destination for that data, where the data may be temporarily stored. At the same time, the execution unit indicates the data on the bus is valid by setting a "valid" bit to an appropriate state. In this manner, while the data is on the bus, and before or at the same time the data is stored within the designated intermediate storage buffer, any other execution unit which requires that data may retrieve the data from the bus. Thus, one advantage of the provision of independent buses is the elimination of the need to store the data in a buffer and then thereafter access that data from the buffer. The ability to retrieve data directly from the bus will significantly increase the operation speed of the processor system.

Still referring to FIG. 3, it may be seen that multiple independent buses 64 are each coupled to general purpose registers 62. When an instruction is to be dispatched to an execution unit, the relationship between the designated intermediate storage buffer and the selected general purpose register is preferably stored within the storage buffer index 58. When the results of execution are needed by another execution unit, the transfer of those results may be performed utilizing the information within storage buffer index 58. As will be discussed in greater detail herein, the information stored within storage buffer index 58 may be an identifier for the designated intermediate storage buffer which is accessed utilizing the general purpose register identification or an identifier of a general purpose register which is accessed with the identification of the designated intermediate storage buffer.

In this manner, the maintenance of complex lookup tables typically associated with a register renaming scheme is not required, since an intermediate storage buffer may be immediately assigned as a storage location for each destination operand within an instruction to be dispatched, without requiring the renaming of a general purpose register file. Furthermore, storage buffer index 58 permits the execution of instructions in a non-sequential manner, since the results of execution of each instruction are temporarily stored in intermediate storage buffers 60, and may be subsequently utilized by a succeeding instruction by utilizing the information within storage buffer index 58 and the content of completion buffer 48 (see FIG. 2).

Figure 4:
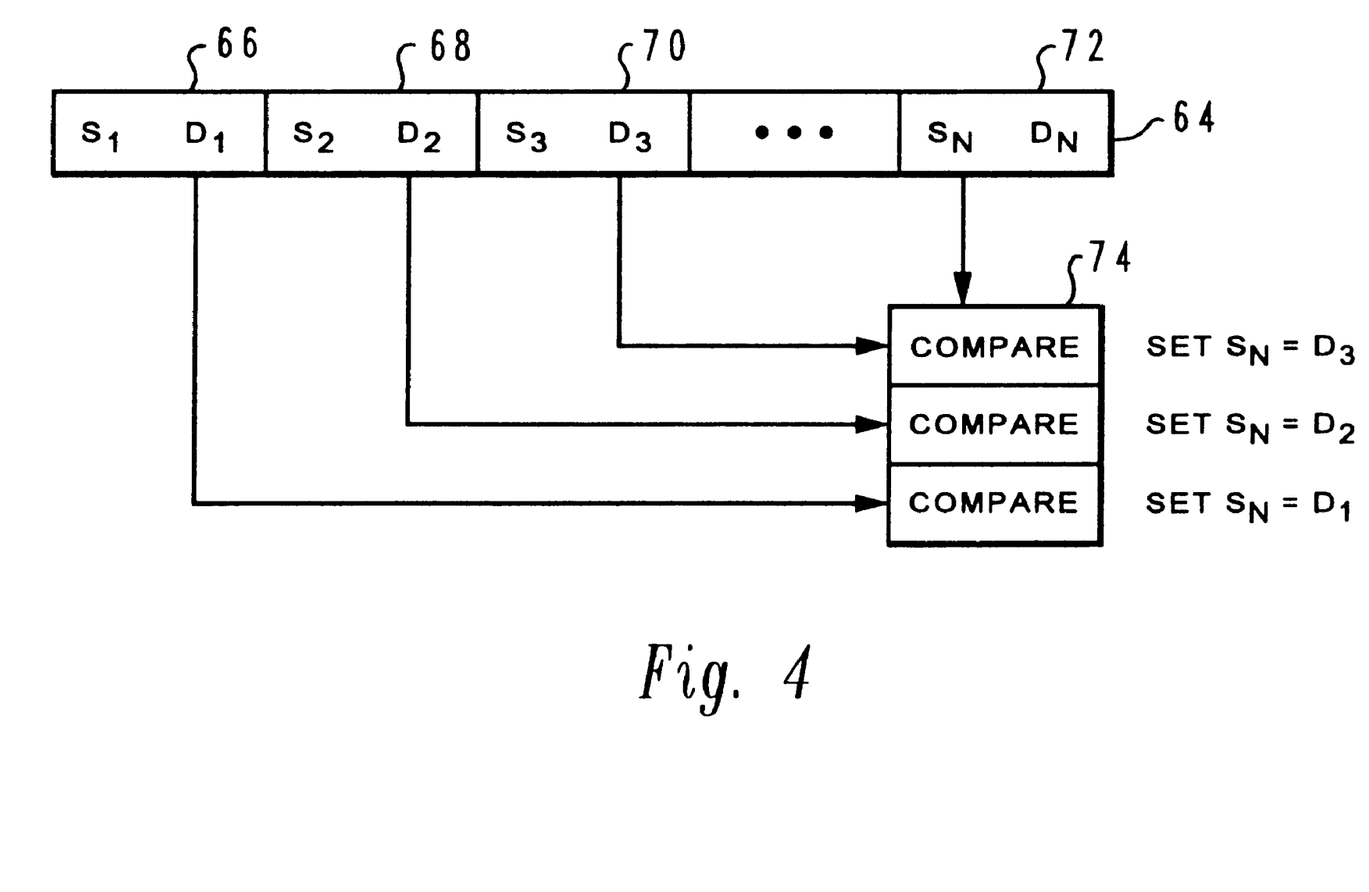
FIG. 4 is a schematic representation of a dispatch control process in accordance with the method and system of the present invention.

Referring now to FIG. 4 there is depicted a schematic representation of a dispatch control process in accordance with the method and system of the present invention. As depicted, a plurality of instructions are illustrated within instruction dispatch buffer 64. Thus, instruction 66, 68, 70 and 72, represent a plurality of instructions which have been loaded into instruction dispatch buffer 64 in an application specified sequential order. Each instruction, as illustrated, generally includes a source operand and a destination operand; however, those skilled in the art will appreciate that a greater number of operands may be present.

In accordance with an important feature of the present invention an attempted dispatch of instruction 72 will require the assignment of an intermediate storage buffer to be utilized for destination $D_N$. Additionally, it will be necessary to specify a location to be utilized for source operand $S_N$. This is accomplished, in accordance with the method and system of the present invention, by first comparing source operand $S_N$ with the destination operands within instruction dispatch buffer 64 which precede that source operand. Thus, compare unit 74 is utilized to compare destinations $D_3$, $D_2$ and $D_1$ with source operand $S_N$. This process is utilized to determine whether or not the location specified for source operand $S_N$ is currently within instruction dispatch buffer 64. As each instruction may sequentially modify the content of that source and as instructions within instruction dispatch buffer 64 are set forth within the application specified sequential order, the most recent destination which precedes instruction 72 and which is equal to source operand $S_N$ is utilized. Thus, if the first comparison utilizing compare unit 74 indicates a match then the specification for source operand $S_N$ is set equal destination operand $D_3$. Similarly, the specification for source operand $S_N$ may also be set to destination operands $D_2$ or $D_1$ in the event that no preceding destination operand matches source operand $S_N$.

Figure 5:
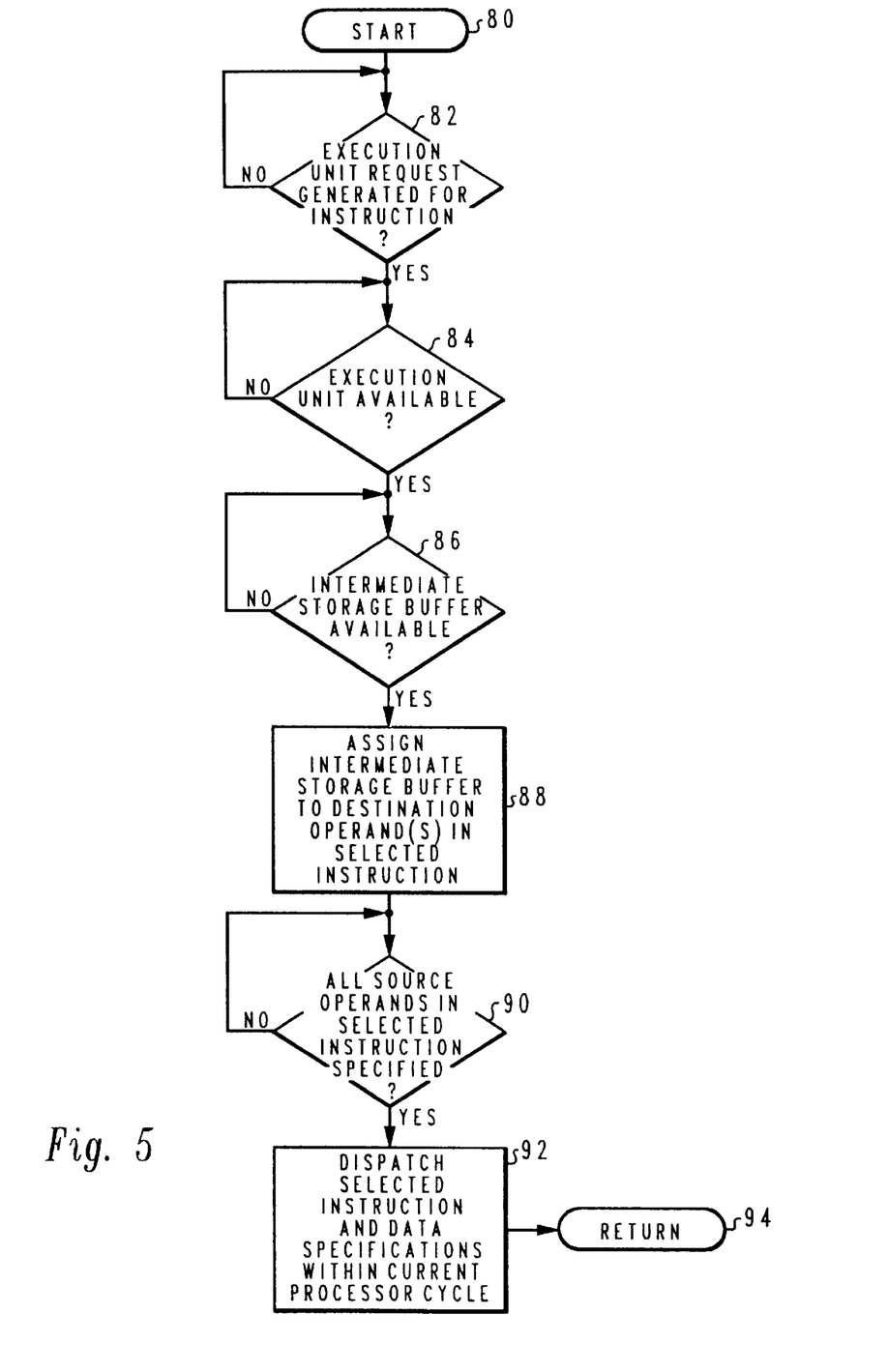
FIG. 5 is a logic flowchart which depicts a process for single cycle instruction dispatch in accordance with the method and system of the present invention.

With reference now to FIG. 5 there is depicted a logic flowchart which illustrates a process for single cycle instruction dispatch in accordance with the method and system of the present invention. As depicted, the process begins at block 80 and thereafter passes to block 82. Block 82 illustrates a determination of whether or not an execution unit request has been generated for a particular instruction. If not, this process merely iterates until such time as an execution unit request has been generated. However, after an execution unit request has been generated the process passes to block 84.

Block 84 illustrates a determination of whether or not an execution unit of the type required for this instruction is available. If not, the process merely iterates until such time as an appropriate execution unit becomes available. Thereafter, the process passes to block 86. Block 86 depicts a determination of whether or not an intermediate storage buffer is available for each destination operand within the instruction to be dispatched. In accordance with an important feature of the present invention, an intermediate storage buffer is assigned to each destination operand within an instruction so that the instruction and the data associated therewith may be dispatched within a single processor cycle, without requiring the complex determination of a renamed register within a general purpose register file. If an intermediate storage buffer is not available for assignment to the destination operands within the selected instruction, the process awaits the availability of such an intermediate storage buffer.

Next, the process passes to block 88. Block 88 illustrates the assignment of an intermediate storage buffer to the destination operand(s) in the selected instruction, upon the availability of such an intermediate storage buffer. Thereafter, the process passes to block 90. Block 90 illustrates a determination of whether or not all source operands within the selected instruction have been specified. As will be set forth in greater detail below, it will be necessary to specify a source or location to obtain data for each source operand contained within an instruction prior to permitting that instruction to be dispatched. In the event all source operands within the selected instruction are not specified the process merely iterates until such time as a specification for each source operand is determined.

Thereafter, after all source operands within the selected instruction have been specified, the process passes to block 92. Block 92 illustrates the dispatching of the selected instruction and data specifications within the current processor cycle. Thus, by permitting intermediate storage buffers to be assigned for destination operands within each instruction the method and system of the present invention permits an instruction and the data specifications necessary to execute that instruction to be dispatched within a single processor cycle. Thereafter, the process passes to block 94 and returns. While the process steps described above have been illustrated as occurring serially, those skilled in the art will appreciate that for purposes of efficiency these steps will generally occur substantially simultaneously, in parallel.

Figure 6:
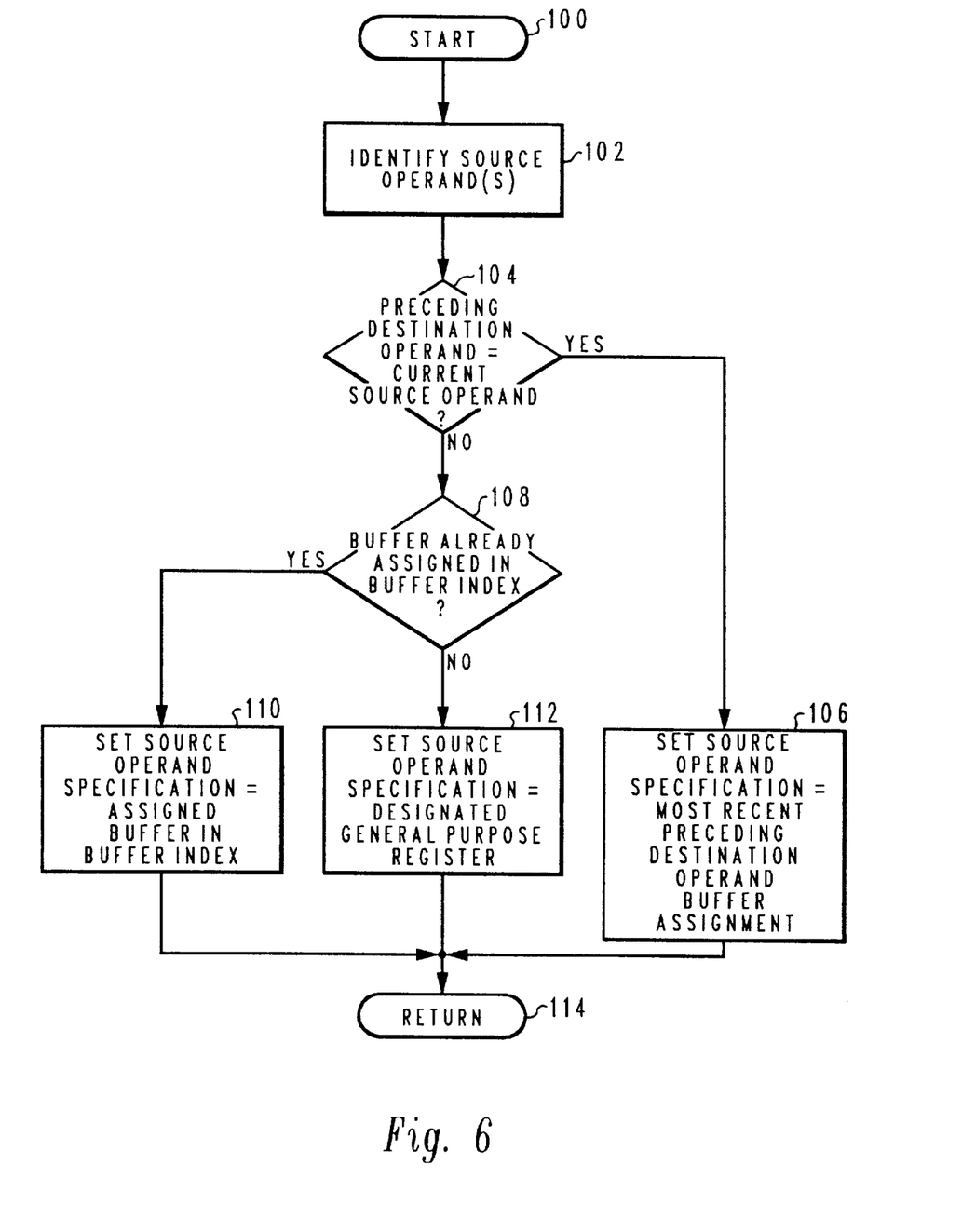
FIG. 6 is a logic flowchart which depicts a process for specifying source operands in a selected instruction in accordance with the method and system of the present invention.

Finally, referring to FIG. 6 there is depicted a logic flowchart which illustrates a process for specifying source operands in a selected instruction in accordance with the method and system of the present invention. As depicted, this process begins at block 100 and thereafter passes to block 102. Block 102 illustrates the identification of a source operand within the instruction for specification. Thereafter, the process passes to block 104. Block 104 illustrates the determination of whether or not a preceding destination operand within an instruction within the instruction dispatch buffer is equal to the current source operand under consideration. If so, the process passes to block 106.

Block 106 illustrates the setting of the source operand specification to the most recent preceding destination operand buffer assignment. Of course, those skilled in the art will appreciate that each successive instruction in the application specified sequential order may alter the contents of a buffer which has been assigned to a particular destination. Thus, the most recent preceding destination operand buffer assignment must always be utilized. Thereafter, the process passes to block 114 and returns, permitting the instruction to be dispatched, as described with respect to FIG. 5.

Referring again to block 104, in the event no preceding destination operand within the instruction dispatch buffer is equal to the current source operand the process passes to block 108. Block 108 illustrates a determination of whether or not an instruction buffer for this source operand is already assigned within the buffer index, as described above. If so, the process passes to block 110. Block 110 illustrates the setting of the source operand specification to the assigned buffer within the buffer index and the process then passes to block 114 and returns. In this manner, if an intermediate storage buffer has been assigned to a preceding destination which serve as a source in the current instruction the identification of the appropriate intermediate storage buffer may be accomplished even if the preceding instruction has been dispatched.

Finally, referring again to block 108, in the event the buffer for the identified source operand is not assigned within the buffer index the process passes to block 112. Block 112 illustrates the setting of the source operand specification to the designated general purpose register within the general purpose register files and the process then returns, as depicted at block 114.

Although the process within the present flowchart is described in a serial fashion, those skilled in the art will appreciate that for the sake of increased instruction dispatch efficiency, a determination of whether or not a preceding destination operand is equal to the current source operand, whether or not an instruction buffer has already been assigned within the buffer index or whether or not the general purpose register should be designated for the specification of the current source operand will typically occur in parallel, greatly enhancing the efficiency of the process.

While the invention has been particularly shown and described with reference to a preferred embodiment, it will be understood by those skilled in the art that various changes in form and detail may be made therein without departing from the spirit and scope of the invention.

We claim:

1. A method for enhanced instruction dispatch efficiency in a superscalar processor system capable of fetching an application specified ordered sequence of scalar instructions and simultaneously dispatching a group of said scalar instructions to a plurality of execution units, said method comprising the steps of:

providing a plurality of intermediate storage buffers within said superscalar processor system;

coupling each of said plurality of intermediate storage buffers to all of said plurality of execution units via an independent bus wherein each independent bus is associated with a single one of said plurality of intermediate storage buffers;

dispatching selected ones of said group of scalar instructions to selected ones of said plurality of execution units on an opportunistic basis; and transferring a result of execution of each of said dispatched scalar instructions from one of said plurality of execution units to a designated one of said plurality of intermediate storage buffers via an associated independent bus, wherein said results may be stored without contention for access among said plurality of execution units and wherein said result is available to each of said plurality of execution units.

2. The method for enhanced instruction dispatch efficiency in a superscalar processor system according to claim 1, further including the step of transferring said result of execution of each of said dispatched scalar instructions from said plurality of intermediate storage buffers to selected general purpose registers.

3. The method for enhanced instruction dispatch efficiency in a superscalar processor system according to claim 1, wherein said step of providing a plurality of intermediate storage buffers within said superscalar processor system comprises the step of providing twelve intermediate storage buffers within said superscalar processor system.

4. The method for enhanced instruction dispatch efficiency in a superscalar processor system according to claim 3, wherein said step of coupling each of said plurality of intermediate storage buffers to each of said plurality of execution units via an independent bus comprises the step of coupling twelve independent buses to each of said plurality of execution units, each of said twelve independent buses being coupled to one of said twelve intermediate storage buffers.

5. The method for enhanced instruction dispatch efficiency in a superscalar processor system according to claim 1, wherein said step of transferring a result of execution of each of said dispatch scalar instructions from one of said plurality of execution units to a designated one of said plurality of intermediate storage buffers via an independent bus further includes the step of providing an indication that data on said independent bus is valid in response to said transferring.

6. A system for enhanced instruction dispatch efficiency in a superscalar processor system capable of fetching an application specified ordered sequence of scalar instructions and simultaneously dispatching a group of said scalar instructions to a plurality of execution units, said system comprising:

a plurality of intermediate storage buffers within said superscalar processor system;

means for coupling each of said plurality of intermediate storage buffers to all of said plurality of execution units via an independent bus wherein each independent bus is associated with a single one of said plurality of intermediate storage buffers;

means for dispatching selected ones of said group of scalar instructions to selected ones of said plurality of execution units on an opportunistic basis; and means for transferring a result of execution of each of said dispatched scalar instructions from one of said plurality of execution units to a designated one of said plurality of intermediate storage buffers via an associated independent bus, wherein said results may be stored without contention for access among said plurality of execution units and wherein said result is available to each of said plurality of execution units.

7. The system for enhanced instruction dispatch efficiency in a superscalar processor system according to claim 6, further including means for transferring said result of execution of each of said dispatched scalar instructions from said plurality of intermediate storage buffers to selected general purpose registers.

8. The system for enhanced instruction dispatch efficiency in a superscalar processor system according to claim 6, wherein said plurality of intermediate storage buffers within said superscalar processor system comprises twelve intermediate storage buffers within said superscalar processor system.

9. The system for enhanced instruction dispatch efficiency in a superscalar processor system according to claim 8, wherein said means for coupling each of said plurality of intermediate storage buffers to each of said plurality of execution units via an independent bus comprises twelve independent buses coupled to each of said plurality of execution units, each of said twelve independent buses being coupled to one of said twelve intermediate storage buffers.

10. The system for enhanced instruction dispatch efficiency in a superscalar processor system according to claim 6, wherein said means for transferring a result of execution of each of said dispatch scalar instructions from one of said plurality of execution units to a designated one of said plurality of intermediate storage buffers via an independent bus further includes means for providing an indication that data on said independent bus is valid in response to said transferring.

* * * * *